(12) United States Patent
Henksmeier et al.

(10) Patent No.: US 10,226,809 B2
(45) Date of Patent: Mar. 12, 2019

(54) METHOD FOR PRODUCING A SHAPED SHEET METAL PART HAVING WALL THICKNESSES DIFFERING FROM EACH OTHER BY REGION, AND AXLE SUBFRAME

(71) Applicant: Benteler Automobiltechnik GmbH, Paderborn (DE)

(72) Inventors: Thomas Henksmeier, Lippstadt (DE); Erik Hochapfel, Gudensberg (DE); Dieter Friesen, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/557,679

(22) PCT Filed: Mar. 14, 2016

(86) PCT No.: PCT/DE2016/100114
§ 371 (c)(1),
(2) Date: Sep. 12, 2017

(87) PCT Pub. No.: WO2016/146107
PCT Pub. Date: Sep. 22, 2016

(65) Prior Publication Data
US 2018/0050380 A1 Feb. 22, 2018

(30) Foreign Application Priority Data

Mar. 13, 2015 (DE) .......... 10 2015 103 721

(51) Int. Cl.
*B21D 25/00* (2006.01)
*B21D 53/88* (2006.01)
(Continued)

(52) U.S. Cl.
CPC .......... *B21D 25/00* (2013.01); *B21D 22/02* (2013.01); *B21D 35/006* (2013.01); *B21D 53/88* (2013.01);
(Continued)

(58) Field of Classification Search
CPC ........ B21D 13/02; B21D 22/02; B21D 22/07; B21D 24/04; B21D 25/00; B21D 35/006;
(Continued)

(56) References Cited

U.S. PATENT DOCUMENTS 1,613,592 A * 1/1927 Smith ............... B21D 53/90
267/52
1,620,616 A * 3/1927 Lambert ............. B21D 53/90
29/463

(Continued)

FOREIGN PATENT DOCUMENTS

CN 201537814 U 8/2010
DE 10048312 B4 7/2004
(Continued)

OTHER PUBLICATIONS

Schwarz N et al: "Flexibel Gewalzte Blech Fuer Belastungsangepasste Werkstuecke", Werkstatt + Betrieb, Carl Hanser Verlag, Muenche DE, vol. 131, No. 5, May 1, 1998 (May 1, 1998), pp. 424-427, XP000776752, ISSN: 0043-2792.
(Continued)

*Primary Examiner* — Edward Tolan
(74) *Attorney, Agent, or Firm* — Hauptman Ham, LLP

(57) ABSTRACT

A method for producing a shaped sheet metal component having wall thicknesses differing from each other is disclosed including providing a sheet metal material having a constant wall thickness, pre-shaping the sheet metal material into a preform by means of a hold-down press, producing at least one bulge in an inner region such that the material is (Continued)

stretched and has a reduced wall thickness, flattening and/or extending the produced preform, cutting the sheet metal material in order to form a blank before, during, or after the pre-shaping, and shaping the blank into the shaped sheet metal component.

22 Claims, 19 Drawing Sheets

(51) Int. Cl.
    *B21D 35/00*    (2006.01)
    *B21D 53/90*    (2006.01)
    *B21D 22/02*    (2006.01)
    *B62D 21/11*    (2006.01)
    *B21D 13/02*    (2006.01)
    *B21D 22/00*    (2006.01)

(52) U.S. Cl.
    CPC ............. *B21D 53/90* (2013.01); *B62D 21/11* (2013.01); *B21D 13/02* (2013.01); *B21D 22/00* (2013.01)

(58) Field of Classification Search
    CPC ........ B21D 53/88; B21D 53/90; B21D 22/00; B62D 21/11; B23P 2700/14
    See application file for complete search history.

(56) References Cited

U.S. PATENT DOCUMENTS

| | | | | |
|---|---|---|---|---|
| 1,940,305 A * | 12/1933 | Kapitke | ................. | B21D 53/90 29/463 |
| 2,112,653 A * | 3/1938 | MacLennan | ......... | B21D 35/006 72/348 |
| 2,145,046 A * | 1/1939 | Gettig | .................... | B21D 53/90 228/144 |
| 3,828,705 A * | 8/1974 | Morrison | ................ | B21D 13/02 72/332 |
| 4,027,521 A * | 6/1977 | McKee | .................. | B21D 53/36 29/874 |
| 4,233,833 A * | 11/1980 | Balinski | ................ | B21D 13/045 72/180 |
| 4,847,993 A * | 7/1989 | Lin | ......................... | H01R 43/16 29/874 |
| 2006/0033347 A1 | 2/2006 | Hauger et al. | | |
| 2009/0266135 A1 | 10/2009 | Knaup | | |
| 2012/0055223 A1* | 3/2012 | Watanabe | .............. | B21D 13/02 72/347 |
| 2012/0312065 A1 | 12/2012 | Carter et al. | | |
| 2013/0283881 A1 | 10/2013 | Hauger et al. | | |
| 2013/0328283 A1* | 12/2013 | Korte | ..................... | B21D 53/90 280/124.134 |
| 2014/0008938 A1 | 1/2014 | Busch et al. | | |
| 2015/0323075 A1* | 11/2015 | Kullen | ................... | F16J 15/024 277/616 |
| 2016/0129491 A1* | 5/2016 | Taguchi | ................. | B21D 13/02 72/296 |

FOREIGN PATENT DOCUMENTS

| | | |
|---|---|---|
| DE | 10350885 A1 | 6/2005 |
| DE | 102008014103 A1 | 9/2009 |
| DE | 102011005977 A1 | 9/2012 |
| DE | 102012209554 A1 | 12/2012 |
| EP | 1621453 A2 | 2/2006 |
| EP | 2111937 A1 | 10/2009 |
| EP | 2540405 A2 | 1/2013 |

OTHER PUBLICATIONS

International Search Report, International Application No. PCT/DE2016/100114, dated Jul. 19, 2016, 17 pages.

Chinese Office Action for Application No. 201680011800.0 dated Apr. 28, 2018; 9 pp.

* cited by examiner

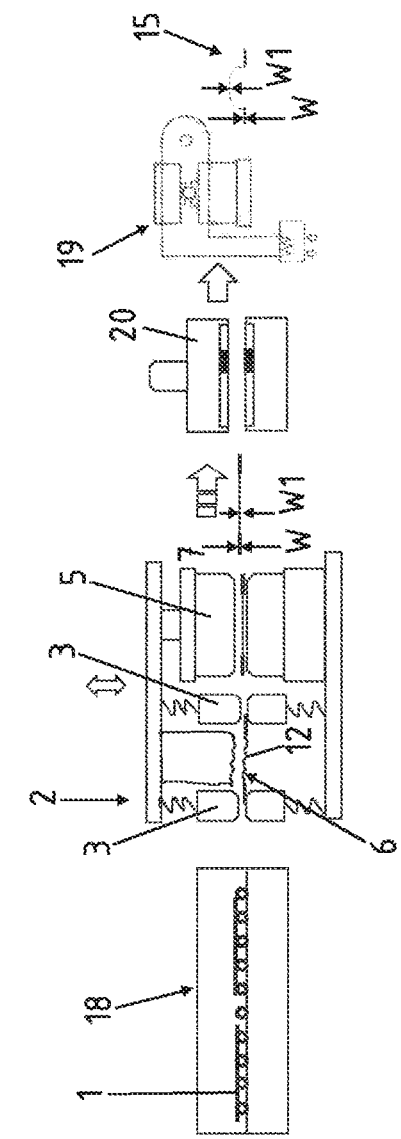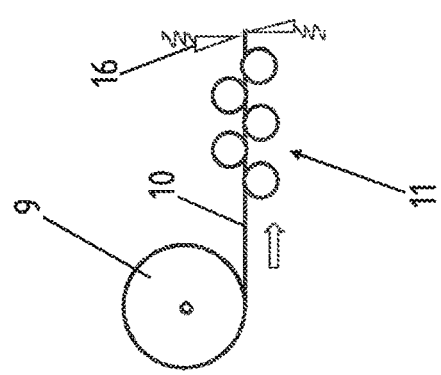
Fig. 4

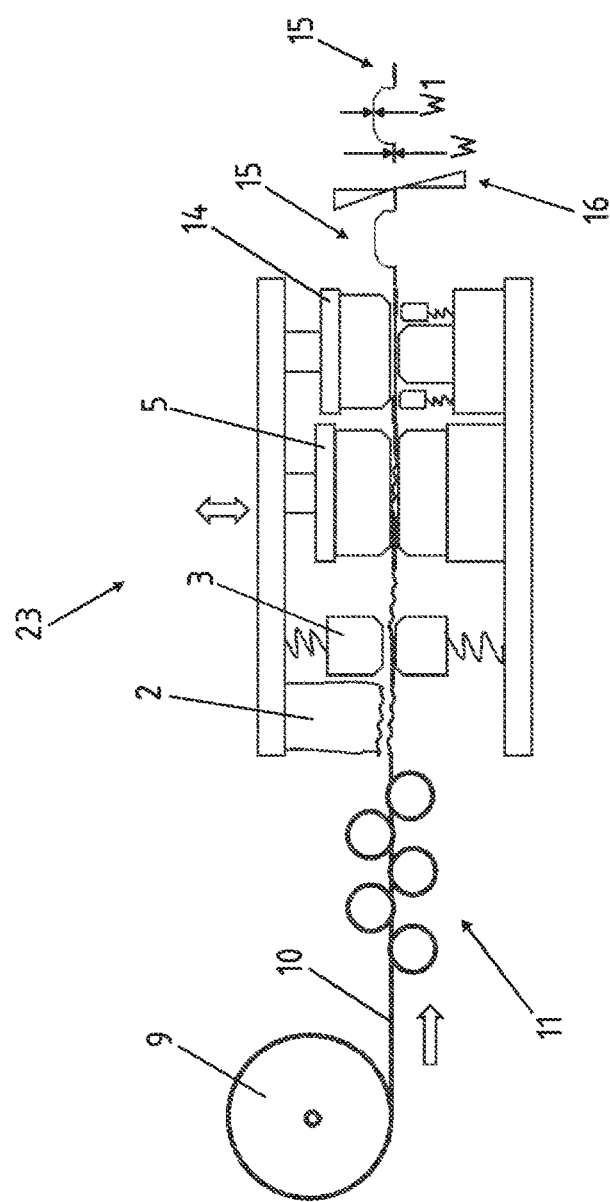

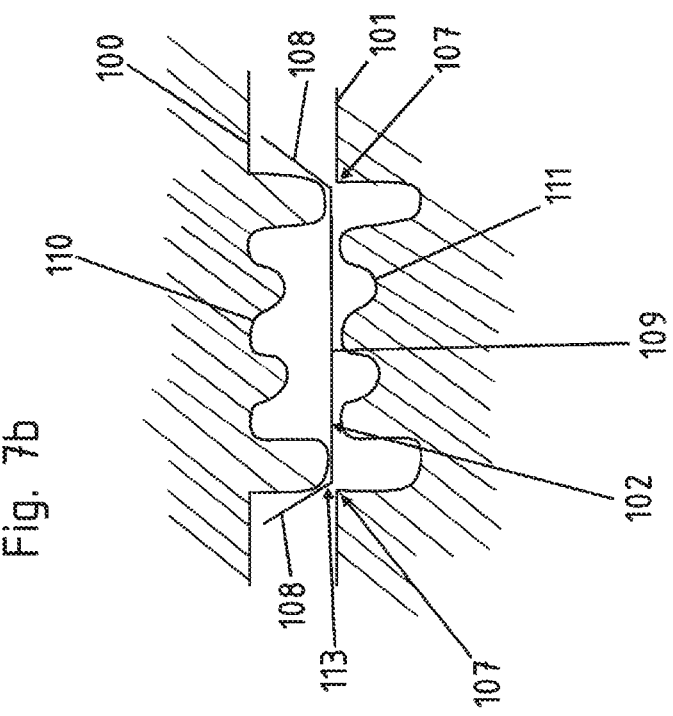
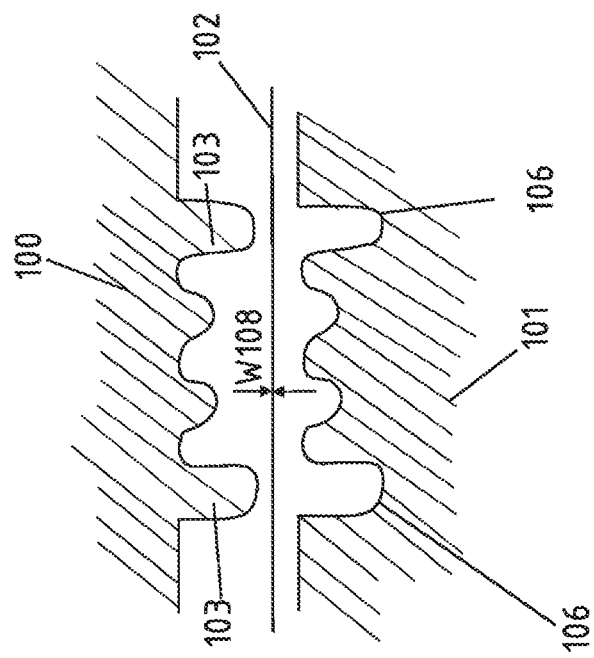

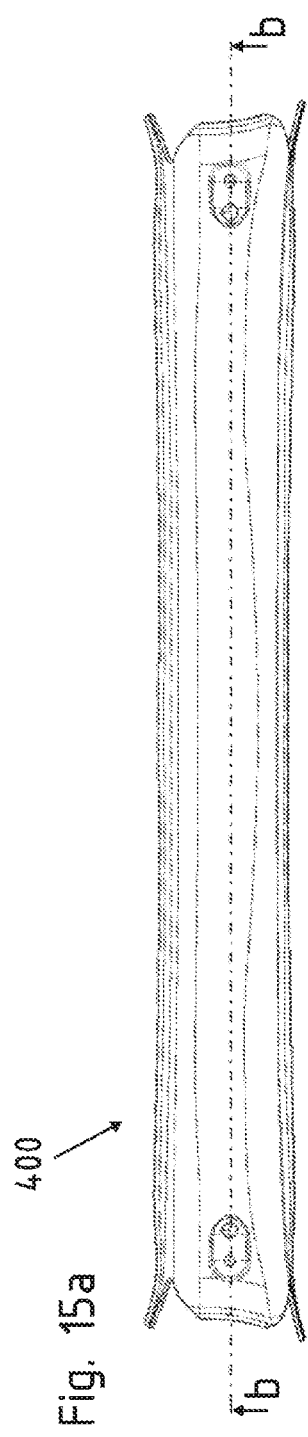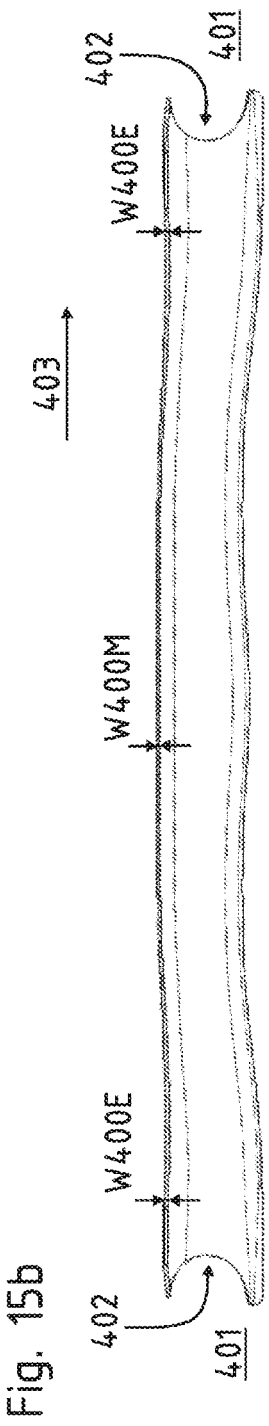

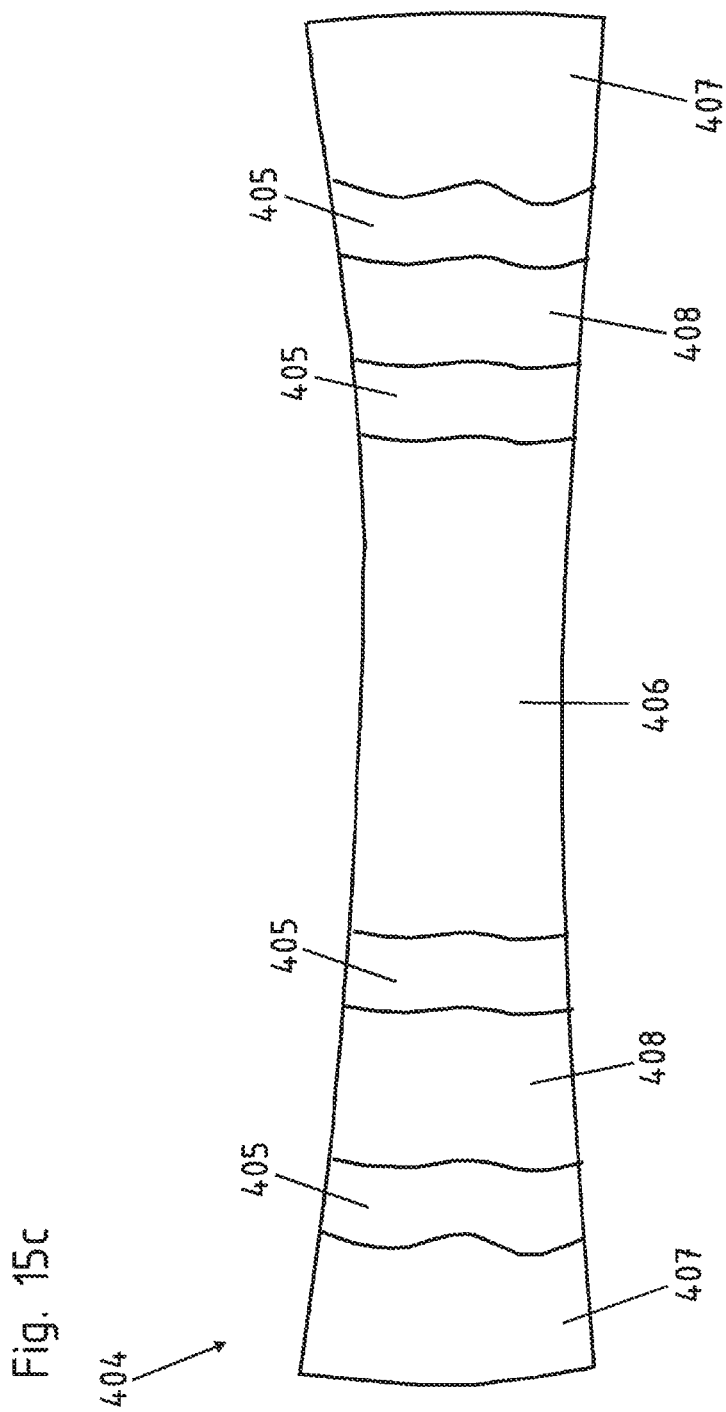

METHOD FOR PRODUCING A SHAPED SHEET METAL PART HAVING WALL THICKNESSES DIFFERING FROM EACH OTHER BY REGION, AND AXLE SUBFRAME

RELATED APPLICATIONS

The present application is a National Phase of International Application Number PCT/DE2016/100114, filed Mar. 14, 2016, which claims priority benefits from German Application Number 10 2015 103 721.1 filed Mar. 13, 2015.

BACKGROUND

1. Field of the Invention

The disclosure is related to a method for producing a sheet-metal formed component with regionally mutually different wall thicknesses.

More specifically, the disclosure is related to a method for producing a sheet-metal formed component with regionally mutually different wall thicknesses.

2. Description of the Related Art

It is known from the prior art for motor vehicle bodies to be manufactured from sheet-metal components. For this purpose, it is normally the case that self-supporting bodies are produced which are constructed from motor vehicle structural components. These include motor vehicle pillars, crossmembers, longitudinal members, transmission tunnels, floor sections, roof beams, etc. The components are normally produced as sheet-metal formed components. For this purpose, hot working and press hardening technology has become established in recent years for the production of components with high-strength or even ultra-high-strength characteristics. For this purpose, a hardenable steel alloy is used, and starting material is provided in the form of blanks. Said blanks are heated to a temperature above the AC3 point, which is referred to as austenitization, and said blanks are thereafter subjected to hot working in said state. This is followed, either in the press forming tool itself or in a separate holding tool, by such rapid cooling, wherein a relatively hard microstructure is produced as a result of quench hardening.

It is however now necessary, firstly, to realize mutually different strength characteristics in one component. At the same time, the production costs and the material outlay should be kept low.

For example, DE 100 483 12 B4 has disclosed an ironing device for blanks, in the case of which mutually different thickness regions are generated in one blank by means of two rolls. Owing to the mutually different wall thicknesses, a component with mutually different strengths is then realized. Furthermore, EP 162 14 53 A2 describes a production method by means of hot working technology, in which even components with mutually different wall thicknesses are processed.

The mutually different wall thicknesses are however normally produced in the components by means of a prior rolling process. A corresponding rolling process however results in high production costs, and in some cases is not practicable for individual blanks.

SUMMARY

It is therefore an object of the invention to provide a method for producing a component with mutually different wall thicknesses, which method can, in relation to methods known from the prior art, be carried out at lower cost and with less material usage with regard to the materials to be processed.

According to one exemplary embodiment, a method for producing a sheet-metal formed component is disclosed, in particular a motor vehicle sheet-metal formed component, from a steel material or light metal, wherein the sheet-metal formed component has regionally mutually different wall thicknesses, is characterized by the following method steps:

providing a sheet-metal material with constant wall thickness, preforming the sheet-metal material to realize a preform by means of a blank holder press, wherein, in an inner region, at least one bulge is generated such that the material in the bulge is ironed and has a reduced wall thickness, flattening and/or spreading out the produced preform, wherein the sheet-metal material is separated, before, during or after the preforming, to realize a blank, optionally trimming and/or introducing holes into the blank, forming the blank to realize the sheet-metal formed component.

Thus, it is provided according to the invention that the mutually different wall thicknesses are produced by means of an ironing process and an associated reduction in wall thickness in an inner region or an internal region. For this purpose, a blank holder tool is used, in particular a blank holder press, wherein, to carry out the ironing process, the blank holder force is increased such that no slippage or only considerably reduced slippage or follow-on flow of material occurs and, by means of the at least one bulge, preferably undulating shape, the material is ironed in order to generate the bulge. This means that, in the inside region, a reduction in wall thickness occurs for the benefit of a change in length caused by the bulge or undulating shape.

By means of targeted control, for example of the blank holder pressure, at particular times during the preforming process, it is thus possible in a targeted manner for ironing to be effected in a homogeneously distributed manner in the bulge or undulating shape. This means that a reduced wall thickness with a homogeneous cross-sectional profile is set in the region of the bulge, and the original wall thickness of the provided sheet-metal material is maintained in the regions situated outside the between the blank holders.

It is advantageously not necessary for the blank holder press to be implemented as an entirely separate tool. It is also possible for an inserted strip tensioner to be used immediately downstream of the production of strip material, wherein then, when the strip tensioner is closed and a forming punch is driven in, a corresponding bulge is generated with an ironing action.

In an alternative solution for producing a sheet-metal formed component with regionally mutually different wall thicknesses, in particular a motor vehicle component composed of a steel material or light metal material, the method is characterized by the following method steps:

providing a sheet-metal material with constant wall thickness, preforming the sheet-metal material to realize a preform, wherein, in an inner region, at least one bulge is generated by means of a press tool, at the margin surfaces which delimit the inner region, in each case one marginal bulge is generated, the amplitude of which is greater than the amplitude of the bulge, or at two opposite sides, during closure of the press tool, a barrier edge bend is generated which effects a slowed follow-on flow of the material outside the barrier edge bend into the region between the barrier edge bends, such that, during closure of the press tool, the sheet-metal material is ironed in the inner region, flattening and/or spreading out the produced preform, wherein the sheet-metal material is separated, before, during or after the preforming, to realize a blank, optionally trimming and/or introducing holes into the blank, forming the blank to realize the sheet-metal formed component.

Here, it is particularly advantageous that no blank holder needs to be used. Rather, at least three bulges are generated, an inner bulge and marginal bulges which each border the inner region. For this purpose, a press tool is used which has an upper tool and a lower tool, and for the production of the marginal bulges, the corresponding tools are configured such that the punch which creates the respective marginal bulge makes the first initial contact with the sheet-metal material to be formed. During the further lowering of the press tool, the sheet-metal material to be preformed then comes into contact with the tool in the region of the marginal bulge, resulting in increased friction, which has the effect that those regions of the sheet-metal material which are situated outside the marginal bulge can perform a follow-on flow into the inner region in a slowed and controlled manner. During the generation of the bulge in the inner region, it is then the case in turn that the material is ironed owing to the slowed follow-on flow, and consequently a reduction of the wall thickness is generated for the benefit of a change in length.

It may alternatively be provided that, at two opposite sides, as a result of closure of the press forming tool, a barrier edge bend is generated which effects a slowed follow-on flow of the material situated outside the barrier edge bend into the inner region or internal region delimited by the barrier edge bend. By means of the targeted forming of at least one bulge in the inner region, the material is thus ironed, which leads to a reduction in the wall thickness. The barrier edge bend is in particular generated as a 45° to 90° edge bend of the sheet-metal blank as a result of closure of the forming tool.

The advantageous design variants described below in the subclaims apply both to the method with blank holder and to the method with marginal bulge. For the sake of simplicity, these will be described in the following description in each case only for one or the other method, wherein a complete repetition for the second method will be dispensed with for the sake of simplicity.

In the case of the two above-described methods, the sheet-metal material, that is to say the starting material provided in the form of a blank or a sheet-metal strip, is configured so as to have a constant wall thickness at least in one region. Said region is then ironed, that is to say the wall thickness is reduced, by means of the method described according to the invention. The remaining regions may likewise have a reduced or else increased wall thickness. In particular, the method is applied to a sheet-metal material which has a constant wall thickness throughout.

The preform thus produced may also be referred to as a semifinished part. Following this, the preform is straightened, which is realized in particular by flattening or spreading-out. The straightening may consequently be performed by means of compression forming, for example in a press tool, or else by tensile forming, such that the ironed blank of the preform is straightened or leveled by being pulled laterally. Combined tensile and compression forming, that is thus a flattening and spreading-out, may also be performed. In the case of the straightening of a sheet-metal strip, the abovementioned steps apply analogously. The straightened sheet-metal strip may then subsequently be separated to form blanks.

In this way, a blank is obtained which has a smaller wall thickness in an inside region in relation to the outer region that borders the inner region. If the blank or the sheet-metal strip is preformed in each case over the entire width, then in the case of the invention, an inside region refers to the region bordered by two outer regions. In the context of the invention, it is however also conceivable for an internal region to be produced, such that the preform is bordered not only by two opposite adjacent regions but is bordered on all four sides, that is to say in a fully enclosed manner, by regions which are not preformed and which thus have the original wall thickness. It is also possible for the preform or the flattened blank to be trimmed subsequently, such that the wall thickness reduction is then produced not only in an inside region but along the cut edge at an outer margin. Said blank may for example also be trimmed subsequently, such that the wall thickness reduction is produced not only in the inside region but then also along the cut edge at an outer margin.

Subsequently, the thus produced straightened blank with mutually different wall thicknesses is transferred into a forming tool and, here, is formed to realize the sheet-metal formed component. The forming is in this case preferably performed as a cold working process or in particular as a hot working and press hardening process. As preferred steel types, use is made of a 22Mnb5 steel or else of a cold-working steel 5235. It is also conceivable to form steels with TRIP characteristics or to form DC04 steel. In the case of light-metal alloys, it is the case in particular that 5000-series or 6000-series aluminum alloys are formed.

In the method according to the invention, it is possible both for individual sheet-metal blanks to be locally straightened and for the preforming operation to be performed on a sheet-metal strip, wherein the sheet-metal strip is unwound from a coil and, following the preforming, the preformed parts of the sheet-metal strip are then cut to length or cut off. In the simplest embodiment, a singly curved undulating shape is produced. Consequently, the inside region has only one bulge as a result of the preforming process. Here, the inside region is defined by being bordered at least by two sides which are engaged on by a blank holder. The inside region may however also be bordered on all sides. Said region is advantageously engaged on by encircling blank holders or from four sides by a respective blank holder.

The bulge is preferably implemented as an undulating shape. In the context of the invention, the undulating shape may also be multiply curved. Consequently, the inside region has a sinusoidal profile. This yields the advantage that the change in length is not effected significantly by the single bulge alone, but rather, owing to the multiplicity of undulation peaks and undulation troughs of the sinusoidal profile without excessive amplitudes of a bulge to only one side, a relatively great change in length is observed, wherein the material involved in the change in length effects a uniform reduction of the wall thickness, which can be controlled by means of the blank holder.

With the method according to the invention, it is possible to reduce the wall thickness by 1% to 40% in relation to the initial wall thickness. Owing to the prior configuration of the external dimensions of the sheet-metal formed component to be produced and/or of the outer cut edges of the straightened blank, the change in length that occurs during the ironing process can be taken account of such that the straightened blank is adapted to the outer component contour dimensions. Consequently, lower material usage for the provision of the sheet-metal blank or of the sheet-metal strip is observed in relation to conventional rolling methods. Furthermore, the freedom with regard to shaping is greater, because the rolling method known from the prior art is always limited by the two oppositely situated roll pairs and the longitudinal extent thereof, which entails increased outlay specifically in the case of production changeovers. For example, if a sheet-metal strip is rolled, then consequently, it is not a partial inside region that is rolled, but rather, the sheet-metal strip is rolled in each case over its entire width for a particular length section. Here, with the ironing according to the invention, it is possible for a wall thickness reduction to be effected locally in an inside region in a targeted manner. Above and below, the expressions "inner region" and "inside region" are used equivalently. "Internal region" means a region that is enclosed on all sides.

It is particularly preferable for the following production steps to be performed.

A particularly preferred process route provides that, firstly, a sheet-metal strip is unwound from a coil and is preferably clamped on two sides, such that, in one length section, preforming is performed over the entire width. Depending on the material used, strain hardening occurs, which at least partially compensates material weakening caused by the ironing process.

This is followed by a flattening and/or spreading-out process by means of tensile and/or compression forming. Said forming process may be performed as simple crash forming without further clamping or alignment. In this way, a tailored formed blank is generated, wherein, owing to the preselected undulation profile, further pleating during the straightening process or flattening process is prevented. The component is thus exclusively flattened.

This is followed by a trimming process so as to realize blanks with regions of mutually different wall thickness. A forming operation is subsequently performed. Said forming operation is preferably performed as cold working in at least one forming step. A sheet-metal formed component is realized which, in the regions with reduced wall thickness, is used by 5% to 30%, in particular 5% to 10%, in relation to the initial wall thickness. Consequently, in the reduced wall thickness region, the wall thickness amounts to approximately 90% of the initial wall thickness.

A further preferred method provides that an optionally coated sheet-metal strip is unwound from a coil, is straightened, and subsequently cut to size so as to realize sheet-metal blanks. The sheet-metal blanks are then heated in a furnace, are metallurgically bonded in the case of the prior coating, and are subsequently clamped on two sides and, in one area section, subjected to hot preforming with local ironing. Here, an undulating profile or a cup-shaped profile is produced. Owing to the fact that the sheet-metal blank still contains at least residual heat, high degrees of deformation, and resulting high ironing rates, are achievable. The clamping on multiple sides may also generate ironing, and the associated wall thickness reduction, in multiple directions. This is followed by a straightening operation, which in turn is performed by flattening and/or spreading-out by means of tensile forming and/or compression forming. In particular, this is in turn performed as simple crash forming without further alignment and/or clamping of the produced preform. As a result of this, too, a tailored formed blank is generated, in the case of which, in turn, pleating during the straightening operation is prevented through targeted preselection of the undulating profile. This is followed by an at least partial austenitization, preferably a complete austenitization, of the flattened preform, and a transfer into a hot working tool in which hot working is performed, followed by subsequent press hardening. By means of the preforming at elevated temperature, it is possible to produce a wall thickness reduction by 2% to 50% in relation to the original initial wall thickness in partial regions.

With the described method according to the invention, it is even possible for pre-coated sheet-metal material to be processed.

A further preferred method provides that the sheet-metal strip is unwound from a coil, is straightened and is cut to size so as to realize sheet-metal blanks. The sheet-metal blanks are heat-treated in a furnace for the purposes of metallurgical bonding, and are immediately clamped at least on two sides. In an inner surface section, an undulating profile is generated, with local ironing, as a result of the preforming process, wherein it is also in turn the case here that, owing to the at least residual heat, relatively high degrees of deformation or ironing rates can be achieved with a reduction in wall thickness.

This is then followed, furthermore preferably still in a state with residual heat, by a flattening and/or spreading-out process by tensile forming and/or compression forming. In this case, too, it is possible a pressure forming process by means of simple crash forming without further clamping or alignment a tailored formed blank to be obtained, wherein the undulating profile generated during the preforming prevents pleating during the straightening operation. This is followed by a cooling process, preferably at room temperature, and possibly temporary storage of the produced preform.

This is followed in turn by an austenitization process, which is performed in particular as a rapid austenitization process, with a subsequent hot working and press hardening process. In this way, too, it is in turn possible on the component to realize a wall thickness reduction of 5% to 30% in relation to the initial wall thickness of the sheet-metal blank.

For example, it is possible with the method according to invention to produce bumper members, transmission tunnels or vehicle pillars.

A further alternative preferred design variant of the present invention provides that a sheet-metal strip is unwound from a coil, is clamped at least on two sides, and, in one area section, is subjected to preforming with local ironing. Here, in turn, an undulating profile or a cup-shaped profile is produced. In the case of clamping on multiple sides, it is possible to achieve thinning in multiple directions, or even over not the entire width of the sheet-metal strip. This is followed by a flattening and/or spreading-out process by means of tensile forming and/or compression forming. In this case, too, it is possible for a tailored formed blank to be generated by simple crash forming without further clamping or alignment, wherein pleating during the straightening operation is prevented by means of the predefined undulating profile. In this method, cutting of the individual produced preforms or sheet-metal blanks is then preferably performed before or after the straightening operation. Following this, the preformed and straightened sheet-metal blanks, that is to say the blanks with mutually different wall thicknesses, are subjected to heat treatment at an austenitization temperature, in particular in a furnace. The blanks are preferably separated before or after the heating. This is followed by a hot working process with subsequent press hardening. In this method, it is perfectly possible to create a sheet-metal formed component which has regions with a wall thickness which is reduced by 5% to 10% in relation to an initial wall thickness.

In particular, in the context of this invention, the wall thickness of the finished sheet-metal formed component outside the regions ironed as a result of the preforming process corresponds to the initial wall thickness.

In the context of the invention, it is possible in all of the described methods for either a sheet-metal strip or a previously separated sheet-metal blank to be used as sheet-metal material. In the case of a sheet-metal blank being used, this is then preformed, flattened, optionally trimmed and/or provided with holes, and the blank that has been thus prepared is subsequently formed, in a forming tool, to realize the sheet-metal formed component.

In the case of a sheet-metal strip, it is possible in the context of the invention for the preform to be generated on the sheet-metal strip itself, and for the sheet-metal strip thus preformed to subsequently be flattened and/or spread out and only thereafter separated so as to realize blanks. In the context of the invention, it is however also possible for the sheet-metal strip to subsequently be separated and then for the separated preforms to each be individually flattened and/or spread out and supplied for further processing.

In particular, in the processing of the sheet-metal strip, it is expedient for said sheet-metal strip to be provided with incisions over at least a part of the width proceeding from the two sides of the sheet-metal strip margin. This is performed in particular before the preforming, though may also be generated during or after the preforming. This offers the advantage that the sheet-metal strip can then be preformed and/or flattened more easily, without any distortion being observed in the upstream sheet-metal strip during the production process. Depending on whether and when incisions are introduced proceeding from the sides, this is from the ironing dimensions or the preform rate, that is to say the change in length, which in the case of a sheet-metal strip means that the sheet-metal strip is reduced in width owing to the preforming. As a result of the at least partial introduction of incisions, the change in width of the sheet-metal strip is compensated such that this does not adversely affect the sheet-metal strip supplied upstream to this process and/or the sheet-metal strip supplied for the further processing.

The part of the object relating to a product is furthermore achieved by means of an axle subframe for a motor vehicle, wherein the axle subframe is produced as a sheet-metal formed component. It is distinguished by the fact that it is produced as a unipartite and materially integral sheet-metal formed component with regions of mutually different wall thicknesses, in particular as a shell-type component. The axle subframe has, in a plan view, a butterfly shape with two end sections which extend in a fan-like manner. Furthermore, the axle subframe has a central section which connects the end sections and which has substantially a constant width. The central section has a region which is implemented with a reduced wall thickness. The reduced wall thickness extends in this case over a part of the longitudinal direction of the central section and over the entire width of the central section. Furthermore, in each end section, there is implemented a region with reduced wall thickness, which region extends partially in the transverse direction and over a part of the length of the end section.

The axle subframe is in particular produced by means of one of the methods described above. In this way, by contrast to a rolled sheet-metal blank with mutually different wall thicknesses, it is possible not only to generate different thickness regions oriented partially in one direction, but to implement, in a unipartite sheet-metal component, regions with mutually different wall thickness which extend in different directions in relation to one another.

For this purpose, it is furthermore preferable if the region with reduced wall thickness is, in the end section, implemented so as to narrow in a fan-like manner inwardly from a free end in the longitudinal direction. This means that the reduced wall thickness is implemented in an edge region at the free end. Furthermore, in the end section, a region with in each case relatively large wall thickness is implemented from both sides in the transverse direction, which region partially encloses the region with reduced wall thickness. In a plan view, it is then the case that the region with reduced wall thickness narrows in a fan-like manner towards the center and finally transitions completely into the region of relatively large wall thickness.

Furthermore, in each case one recess is implemented in the end sections, wherein the recess is implemented in particular in a circular manner. The recesses may for example be introduced by punching or by means of a cutting-out process, and may be provided for example for the lead-through of various components or else for installation or weight-saving purposes.

Furthermore, on the axle subframe, there are provided various screw attachment surfaces, coupling regions and/or bearing receptacles for the attachment of links and/or spring struts, which screw attachment surfaces, coupling regions and/or bearing receptacles are either jointly formed by forming techniques or are for example welded on by means of a coupling method.

Furthermore, the axle subframe is implemented in a shell-like manner, such that a flange margin is implemented so as to run in an at least partially encircling manner on the outside. The flange margin may be designed such that it protrudes, as an encircling margin, relative to a base surface, and at the outside on the encircling margin, there is in turn implemented a flange, which is oriented so as to point outward. In particular, it is thus possible for the axle subframe to be implemented in a two-shell configuration, wherein each shell is produced individually as described above, and then the two shells are placed one over the other so as to implement at least one cavity which is closed in sections. The two shells can be thermally joined together by means of the protruding flanges.

BRIEF DESCRIPTION OF THE DRAWINGS

For an understanding of embodiments of the disclosure, reference is now made to the following description taken in conjunction with the accompanying drawings, in which:

FIG. 4 shows an alternative design variant by means of hot working and repeated heating;

FIG. 6 shows the method from FIG. 5 in a progressive tool;

FIGS. 7a and 7b show a design variant of a preform tool for the second method according to the invention;

FIGS. 15a to 15c show a torsion tube for a twist-beam axle in various views and design variants;

In the figures, the same reference designations are used for identical or similar components, even if a repeated description is omitted for the sake of simplicity.

DETAILED DESCRIPTION OF SOME EMBODIMENTS

Some embodiments will be now described with reference to the Figures.

Figure 1:
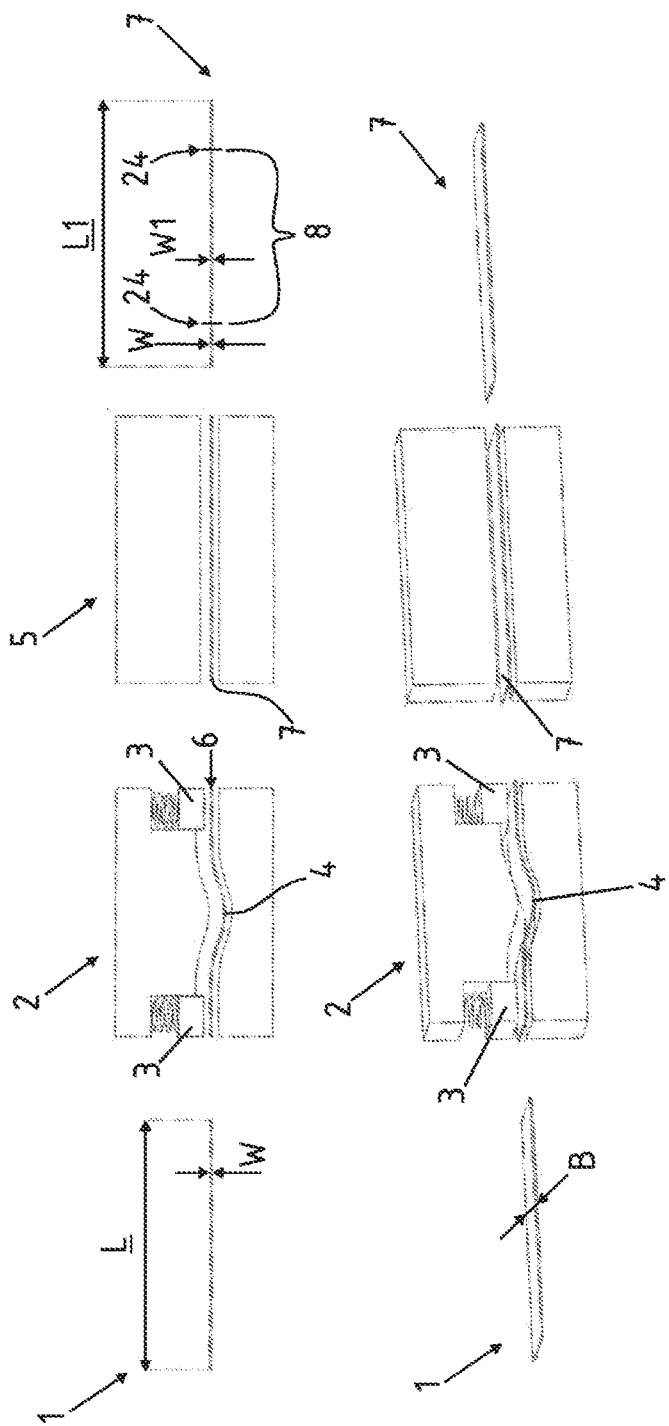
FIG. 1 shows a design variant of the method according to one exemplary embodiment in a side view and in a perspective view.

FIG. 1 shows a sheet-metal blank 1, in a side view in the upper level of the figure and in a perspective view in the lower level of the figure. Said sheet-metal blank 1 is, in one method step, placed into a blank holder press 2, wherein the blank holder press 2 has in each case one blank holder 3 on two opposite sides. By virtue of the blank holder 3 being subjected to an increased blank holder pressure against a counter bearing, a bulge 4 is generated in the sheet-metal blank 1, which bulge leads to a lengthening of the original length L of the sheet-metal blank 1. In the lower level of the figure, it can be clearly seen that the bulge 4 is implemented so as to extend over the entire width B of the sheet-metal blank 1. The material that flows in the longitudinal direction gives rise to a reduction of the wall thickness W1 in the region of the bulge 4 relative to the original wall thickness W, that is to say the starting wall thickness. Here, in a further method step, a compression forming tool 5 is shown in which the produced preform 6 is flattened, and thus a blank 7 with a central ironed region 8 of reduced wall thickness W1 is produced. Said blank 7 has a length L1, wherein the length L1 is longer than the length L and the wall thickness W1 in the ironed region 8 is smaller than the wall thickness W of the original sheet-metal blank 1 which is still present in the respective marginal region or non-deformed regions of the blank 7. In particular, the flattening is performed by crash forming, such that no further centering or alignment is necessary. During the shaping that is to be performed at a later point in time in a forming tool that is not illustrated in any more detail here, self-centering in the forming tool can occur owing to the thickness transition 24 or else owing to the bulge (preform) of the ironed regions 8 with reduced wall thickness W1 in relation to regions with regular wall thickness W.

Figure 2:
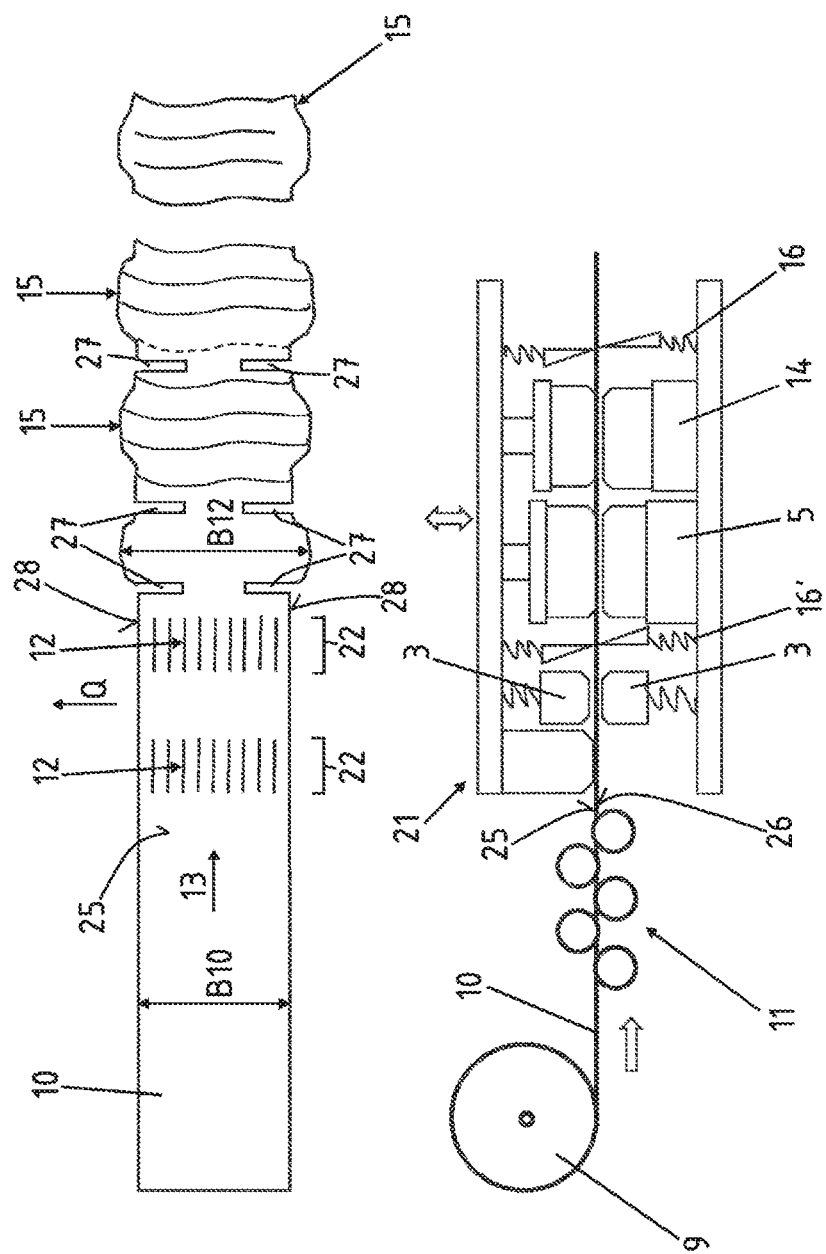
FIG. 2 shows a design variant of the method according to the invention with a sheet-metal strip.

FIG. 2 shows the method according to the invention as an endless process in a progressive tool, in a plan view in the upper level of the figure and in a side view in the lower level. For this purpose, firstly, a starting material is provided on a coil 9 and is unwound from the coil 9 so as to realize a sheet-metal strip 10. A calibrating operation is then performed in a calibration tool 11, whereupon, in a preforming tool 21, owing to the clamping by means of the blank holders 3, an undulating shape 12 is generated which runs in the transverse direction Q with respect to the longitudinal direction 13 of the sheet-metal strip. The undulation peaks then protrude in relation to a top side 25 and/or a bottom side 26 of the sheet-metal strip 10. The undulating shapes 12 are then generated in each case in mutually spaced-apart sheet-metal strip sections 22, which undulating shapes are subsequently in turn flattened in a compressive forming tool 5. As a result, the strip width B12 is widened in the preformed regions of the undulating shape 12 in relation to the original strip width B10 of the sheet-metal strip. Furthermore, a lateral incision 27 is made at the opposite sheet-metal strip margins 28 by means of a trimming station 16'. Thus, a deformation of the sheet-metal strip 10 in the longitudinal direction 13 as a result of the flattening in the compression forming tool 5 is avoided. Following this, a forming process is performed, for example in a press forming tool 14, such that the individual sheet-metal formed components 15, still interconnected, are formed. At a trimming station 16, the initially still interconnected sheet-metal formed components 15 are then separated so as to realize individual sheet-metal formed components 15.

Figure 3:
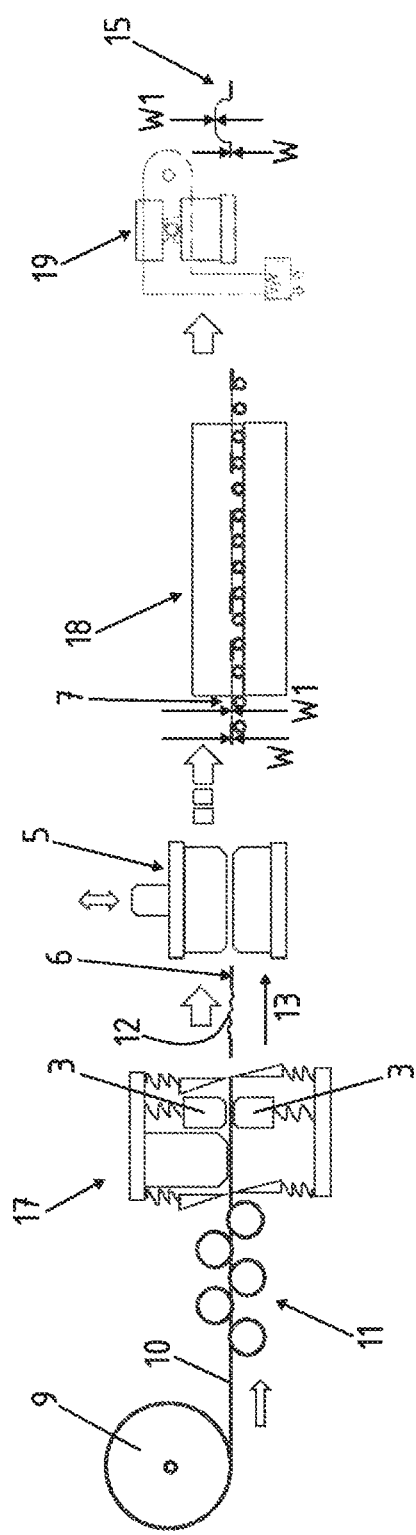
FIG. 3 shows a design variant of the method according to the invention by means of hot working.

FIG. 3 shows a method according to the invention in a hot working process. For this purpose, in turn, a starting material is provided on a coil 9 and is unwound so as to realize a sheet-metal strip 10 and is straightened and calibrated in a calibration tool 11. This is then followed by a combined preforming and separating tool 17, in which, simultaneously, the bulge (not illustrated in any more detail) in the form of an undulating shape 12 is generated in the longitudinal direction 13 of the sheet-metal strip, such that individual preforms 6 are produced simultaneously as a result of the cutting. Said preforms are then in turn flattened in a compression forming tool 5, which may in turn be performed by crash forming without further alignment or calibration. Following this, the individual blanks 7 with mutually different wall thicknesses W, W1 are led through an austenitization furnace 18 and are heated to above an austenitization temperature. Subsequently, said blanks are transferred into a combined hot working and press hardening tool 19 and are subjected to a forming process therein so as to realize the sheet-metal formed component 15. The sheet-metal formed component 15 in this case has regions with mutually different wall thickness W, W1. The direction of the undulating shape 12 is in this case generated in the longitudinal direction 13 of the sheet-metal strip 10.

FIG. 4 shows an alternative method in relation thereto, in which it is also in turn the case that, firstly, the starting material is provided on a coil 9 and is unwound so as to realize a sheet-metal strip and is straightened and calibrated in a downstream calibration tool 11. Following this, in a trimming station 16, a separation process is performed so as to realize individual sheet-metal blanks 1, which are then led through a heating station, in particular also in turn in the form of an austenitization furnace 18. This is followed by the transfer into a blank holder tool 2 in which the individual heated sheet-metal blanks 1 are formed with an undulating shape 12 so as to realize a preform 6, and in the process are ironed, and said blanks are flattened in a compression forming tool 5 situated directly downstream. A blank 7 with regions of mutually different wall thickness W, W1 is thus formed, wherein W1 is smaller than W, which blanks are then in turn annealed, in particular austenitized, in an at least partial reheating station 20, and are subsequently transferred into a hot working and press hardening tool 19 in order to undergo final forming and hardening so as to realize the sheet-metal formed component 15. The sheet-metal formed component 15 in turn has regions with mutually different wall thickness W, W1.

Figure 5:
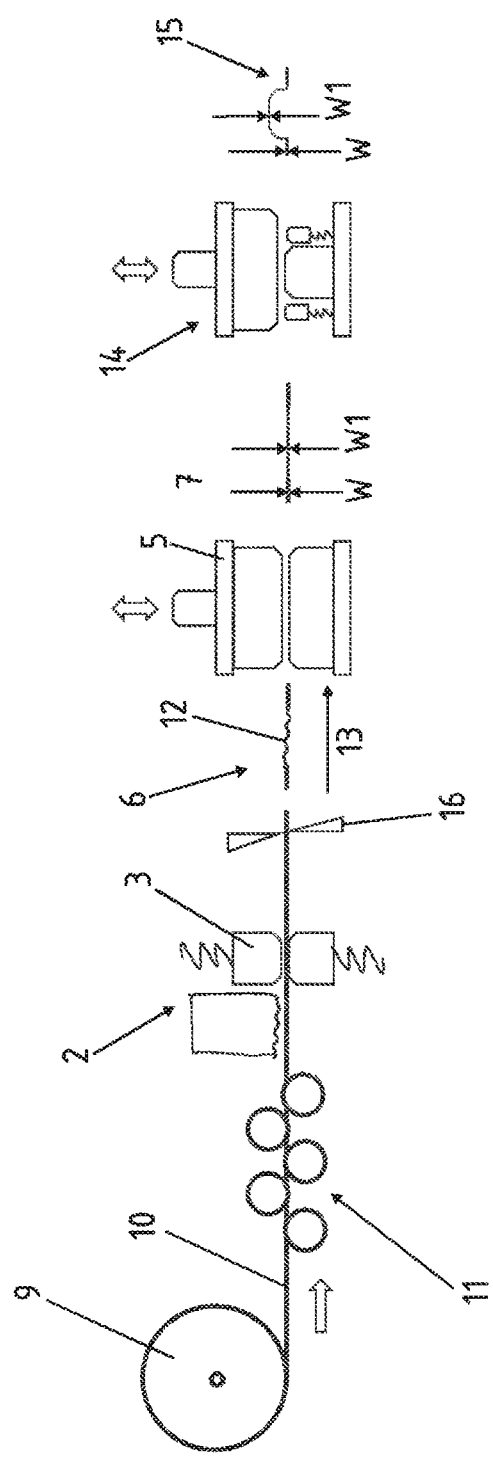
FIG. 5 shows the method according to the invention with strip lengthening in separate tool stages.

FIG. 5 shows an alternative design variant of the method according to the invention, in which it is also in turn the case that a starting material is provided in the form of a coil 9, from which a sheet-metal strip 10 is unwound and is led through a downstream calibration tool 11. This is followed by the production of a corresponding preform 6 in a blank holder tool 2 and separation in a trimming station 16 situated downstream thereof. In this way, too, preforms 6 are produced which have an undulating shape 12 in turn in the longitudinal direction 13 of the sheet-metal strip 10. Said preforms are flattened in a compression forming tool 5, such that, in a downstream press forming tool 14, the individual blanks 7 with mutually different wall thickness W, W1 undergo final forming so as to realize the desired sheet-metal formed component 15 with mutually different wall thicknesses W, W1.

FIG. 6 shows an alternative design variant of the method illustrated in FIG. 5 in a progressive tool 23. The sheet-metal strip 10 is processed continuously until the final shaping and separation of the thus produced sheet-metal strip sections so as to realize the individual sheet-metal formed components 15 with mutually different wall thickness W, W1.

FIGS. 7*a* and *b* show a preforming tool for the production of a preform 105. The preforming tool is implemented as a press tool, having an upper tool 100 and a lower tool 101. A sheet-metal blank 102 is placed therein, wherein, at the outer side of the upper tool 100, there are implemented in each case two punch sections 103 for producing the marginal bulges 104 on the produced preform 105. Said punch sections 103 travel into dies 106, wherein, in FIG. 7*b*, when the upper tool 100 is lowered, in the region of the punch section 103, initial contact occurs with the sheet-metal blank 102 in a contact margin region 107. In FIG. 7*b*, it is also possible to see two barrier edge bends 113, between which, targeted ironing or thinning occurs as the upper tool and lower tool move closer together.

In FIG. 7*b*, the lowered upper tool 100 has then been moved in, in a first contact margin region 107, to such an extent that the sheet-metal blank 102 has been turned up and increased friction occurs in the contact margin regions 107. This has the effect that the outer regions 108 of the blank cannot perform a follow-on flow into the inside region 109 quickly enough, such that, here, by means of the further illustrated generated undulation peaks 110 and undulation troughs 111 on the upper tool 100 and lower tool 101, an undulating profile or an undulating shape 112 is then generated in the inside region 109, wherein here, a wall thickness reduction is realized for the benefit of a change in length. Consequently, the wall thickness W108 of the outer region 108 is greater than the wall thickness W109 of the inside region 109, as can be clearly seen in FIG. 8.

Figure 8:
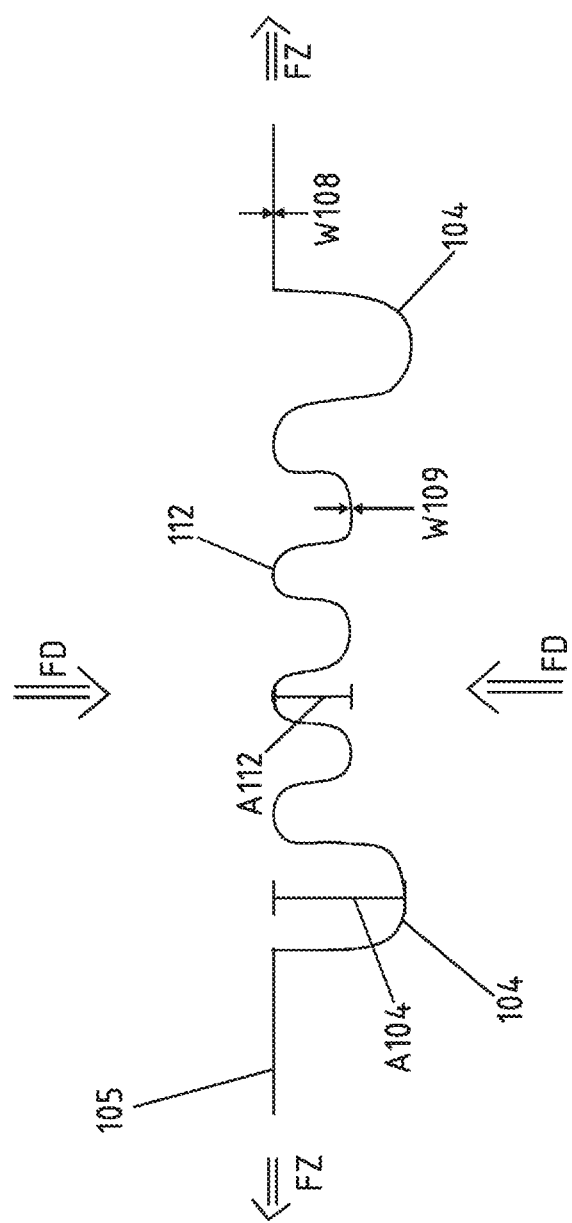
FIG. 8 shows a preform produced by means thereof.

Following this, the preform 105 thus produced can be flattened, as per FIG. 8, by application of a compressive force FD and/or can be spread out by application of a tensile force FZ, likewise illustrated in FIG. 8. It is also illustrated that the amplitude A104 of the marginal bulge 104 is greater than an amplitude A112 of the undulating shape 112 in the inside region 109.

Figure 9:
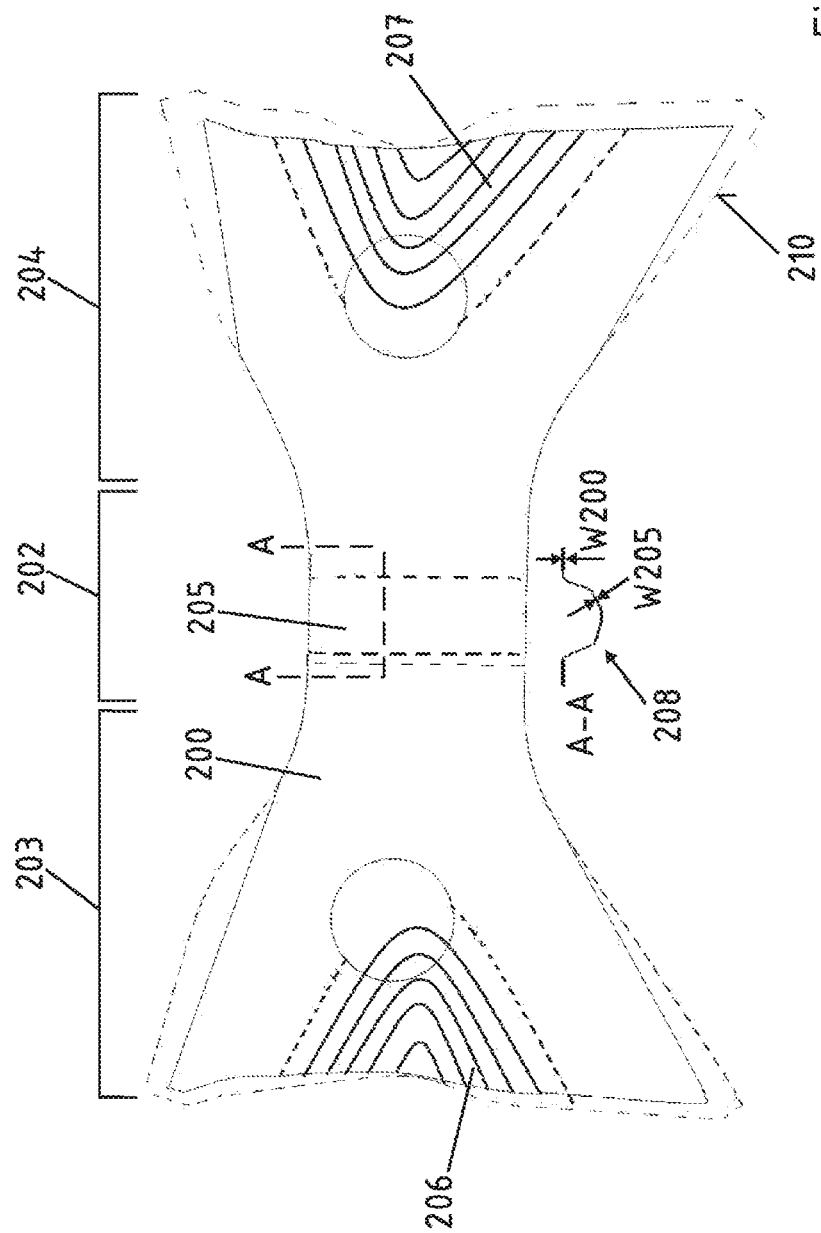
FIG. 9 shows a tailored blank with a bulge and with associated partial ironing.
Figure 12:
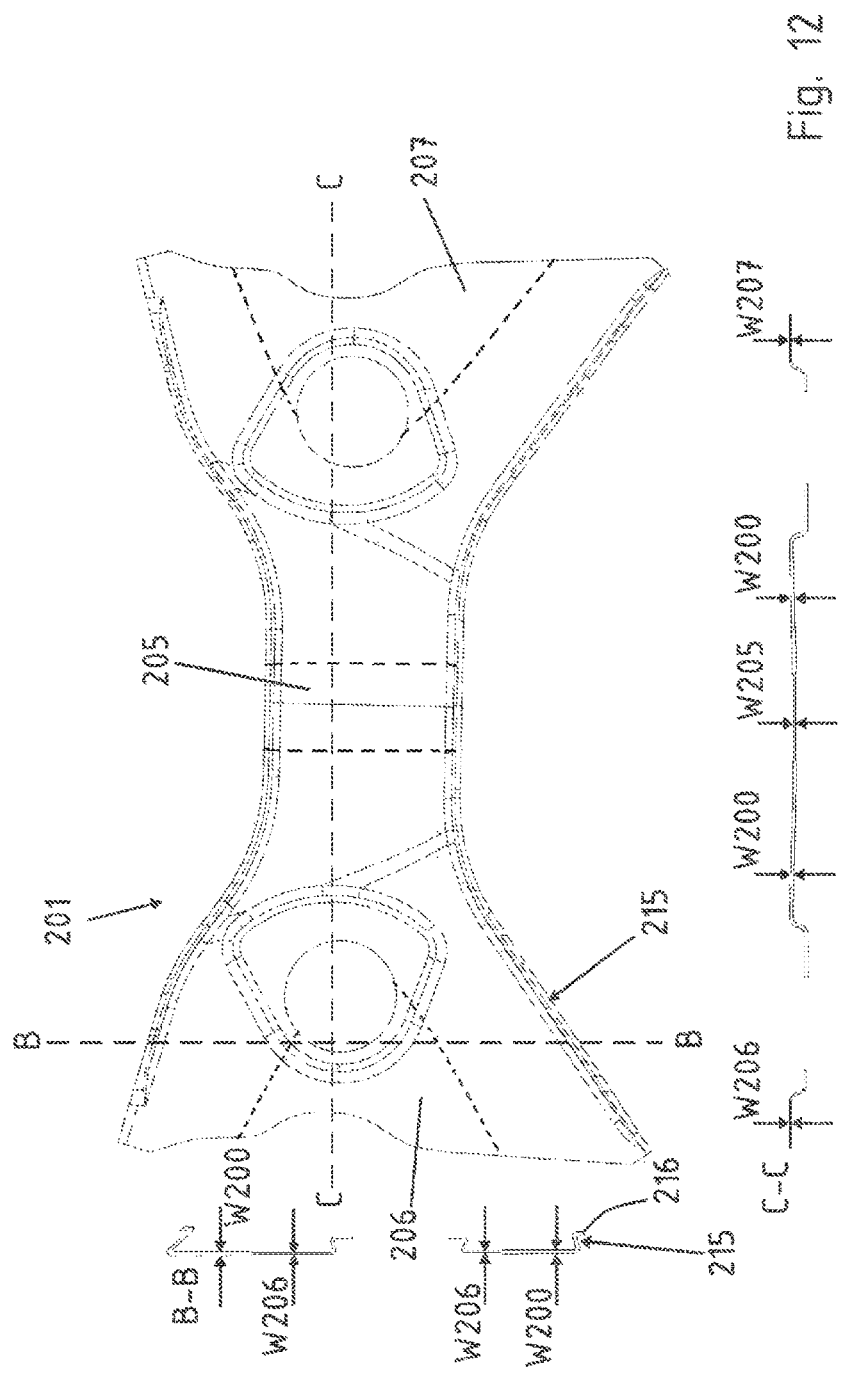
FIG. 12 shows an axle subframe, produced in a shell-like manner, in a plan view and in sectional views.

FIG. 9 shows a blank 200 for the production of an axle subframe 201 illustrated in FIG. 12. The blank 200 is in this case implemented in a butterfly shape in plan view, wherein, with regard to the plane of the figure, two end sections 203, 204 are formed on the left and on the right in relation to a central section 202, wherein the end sections 203, 204 widen in a fan-like manner. In order that a region 205 with reduced wall thickness is now formed in a central section 202 and in each case one region 206, 207 with reduced wall thickness is formed in the end sections 203, 204, the blank 200 has been preformed by means of the above-described method such that a bulge 208, which gives rise to ironing, has been produced both in the region 205 of the central section 202 and in the regions 206, 207 of the end sections 203, 204. This can be clearly seen in the partial sectional view A-A, in which the wall thickness W200 of the blank 200 is greater than the wall thickness W205 of the region 205 which has been deformed as a result of the generation of a bulge 208. For the production of said bulge 208, it can be clearly seen in FIG. 10 that respective blank holders 209 are arranged so as to border the regions 205, 206, 207, such that, during the generation of a respective bulge 208, the wall thickness in said region is ironed and thus reduced owing to the material that can perform only a slowed follow-on flow.

Figure 10:
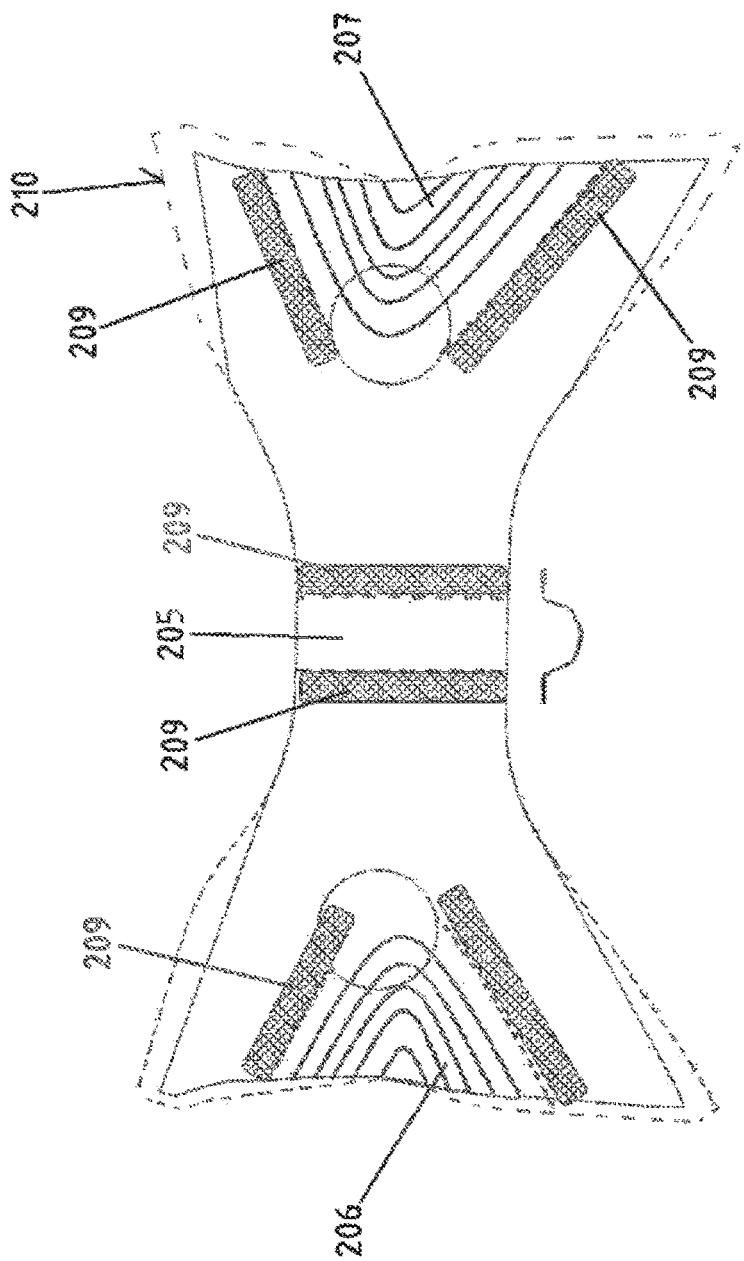
FIG. 10 shows the tailored blank as per FIG. 9 in a tool.

Before the blank 200 with the produced bulges 208 is then placed into a press forming tool, said blank is flattened, wherein the outer contour 210 of the flattened blank 200 is illustrated in each case as a dashed line in FIG. 9 and in FIG. 10. It can be clearly seen that the blank is thus initially smaller than would normally be required for the later forming of the component but, owing to the ironing and flattening, then has a larger outer contour 210 after the flattening, which larger outer contour is then sufficient for the forming of the component.

Figure 11:
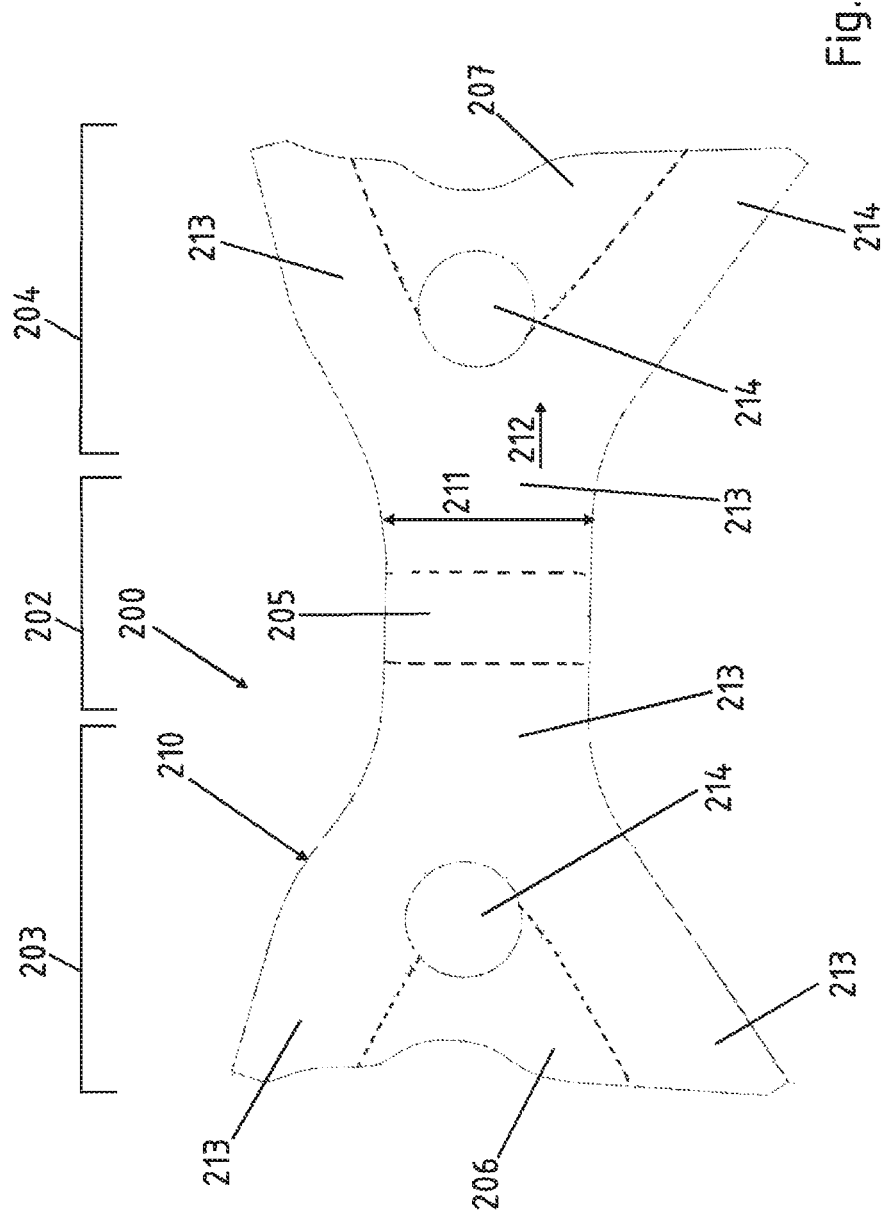
FIG. 11 shows the flattened tailored blank.

The flattened blank 200 is illustrated in FIG. 11, in which it is possible to clearly see, in plan view, the regions 205, 206, 207 with mutually different wall thickness W205, W206, W207. The region 205 is implemented so as to extend over the entire width 211 of the central section 202 and so as to likewise extend over a part in the longitudinal direction 212 of the central section 202. The regions 206, 207 in the end sections 203, 204 likewise extend over a part in the longitudinal direction 212 and over only a part of the width in the end sections 203, 204. Said regions are bordered by respective regions 213 with constant wall thickness W200, which correspond substantially to the initial wall thickness of the original blank. Also provided are recesses 214 which are provided for example by punching or cutting-out processes using laser or water cutting jets.

The thus produced blank 200 with ironed portions and thus reduced wall thickness W205, W206, W207 is then formed, in a press forming tool, so as to realize the axle subframe 201 illustrated in FIG. 12. In the section lines B-B and C-C, it can be clearly seen that, in each case, regions 205, 206, 207 with reduced wall thickness W205, W206, W207 are formed, wherein the wall thicknesses W205, W206, W207 are smaller than the wall thickness W200 of the original blank 200. It can also be seen that the axle subframe 201 is implemented as a shell-like component, in such a way that a partially encircling flange margin 215 is implemented, wherein, on the flange margin 215, there is in turn implemented a flange 216 which protrudes outward.

Figure 13:
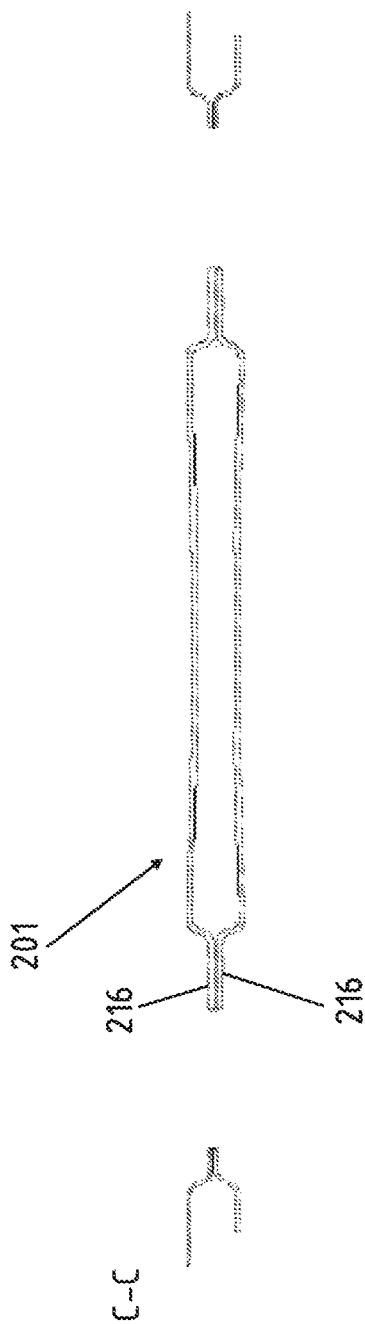
FIG. 13 shows a sectional view of the axle subframe produced in a two-shell configuration.

The flange margin 215 with flange 216 serves in particular for implementing, as per FIG. 13, an axle subframe 201 which is constructed from two shells, wherein then, the flanges 216, of at least partially encircling form, of the two shell components bear against one another and are coupled for example by cohesive joining. Here, FIG. 13 likewise shows a design variant of the blank 200 or shell as per the section line C-C in FIG. 12.

Figure 14:
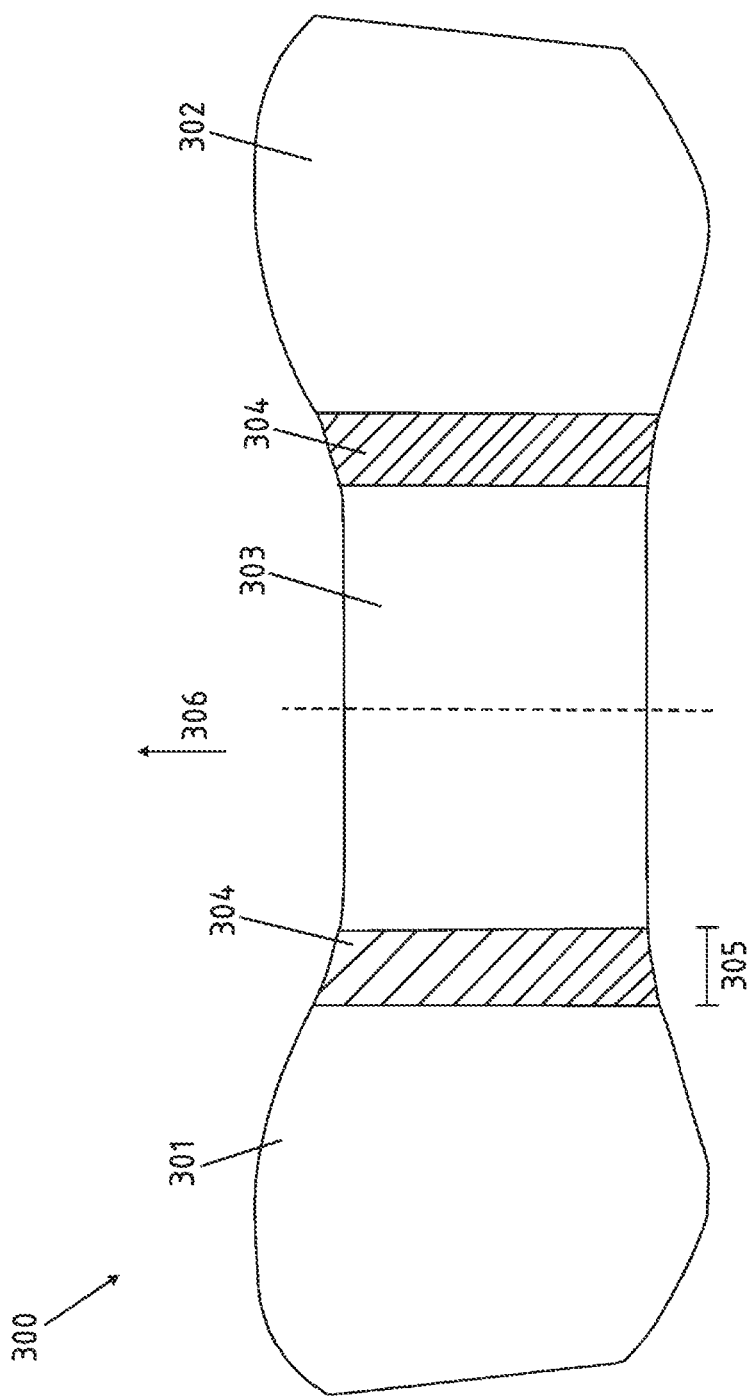
FIG. 14 shows a blank for the production of a transverse bridge of an axle subframe.

FIG. 14 shows a processed blank 300 for the production of a front or rear transverse bridge for an axle subframe. Said blank has, in each case on the left and on the right, an outer section 301, 302 in which the original wall thickness is formed. By contrast, a central section 303 has a reduced wall thickness. Transition sections 304 are implemented between the sections 301, 302. The transition sections 304 have a width 305 of at least 10 mm and at most 100 mm. This specified value is preferably per millimeter of wall thickness of the original wall thickness of the produced blank 300. The transition section 304 is particularly preferably implemented with a width 305 of 20 mm to 50 mm. This specification is likewise particularly preferably in each case per millimeter of wall thickness of the blank 300. The blank 300 for the production of the transverse bridge is preferably configured in the manner of a dog bone. The end sections 301, 302 are thus implemented so as to be larger in the longitudinal direction 306 than the central section 303.

FIG. 15 shows a further application of the present invention. Here, a torsion tube 400 for a twist-beam axle is illustrated in a plan view and, in FIG. 15b, in a sectional view along the section line b-b from FIG. 15a. The torsion tube 400 has, at its ends 401, receiving openings 402 for coupling to longitudinal swing arms (in each case not illustrated in any more detail). The torsion tube 400 is configured in a U-shaped manner in cross section. In the longitudinal direction 403 of the torsion tube 400, the latter has mutually different wall thicknesses. A relatively thin wall thickness W400M is implemented in a central section. By contrast, a relatively large wall thickness W400E is implemented in the end sections. The torsion tube 400 is produced by initially ironing a blank such that the relatively thin wall thickness W400M is implemented in the central section. The torsion tube 400 is subsequently subjected to forming work.

FIG. 15c furthermore shows a blank 404 for the production of an alternative torsion tube 400 illustrated in FIG. 15a. The blank 404 has respective transition sections 405, in which the wall thickness transitions from relatively thick to relatively thin wall thickness. The relatively thick wall thickness corresponds to the initial wall thickness, illustrated in this case for example in the central region 406 and in the end regions 407. By contrast, a respective intermediate region 408 has a reduced wall thickness. It is also conceivable for the blank 404 to have three regions of different wall thickness and for these to transition from the respective end regions 407 via a first transition section into an intermediate region 408 of relatively thin wall thickness and in each case via a further transition section into the thinnest wall thickness in the central region 406.

Figure 16:
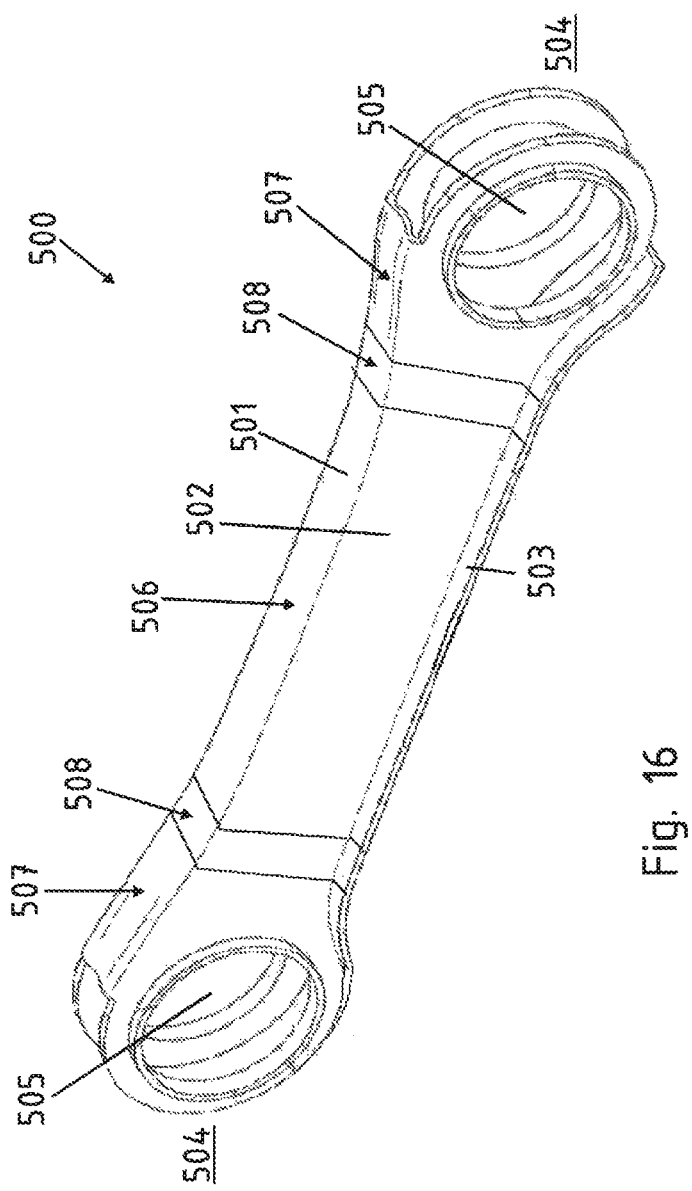
FIG. 16 shows a link for a motor vehicle axle.

FIG. 16 furthermore shows a link 500, produced by means of the method according to the invention, for a motor vehicle axle arrangement. The link 500 is implemented in a U-shaped manner in cross section and has a web 501 and limbs 502 extending from the web 501 and a flange 503 which protrudes in turn from the limbs 502. At the ends 504 of the link 500 there are implemented bearing recesses 505, for example for the insertion of a rubber-metal bearing (not illustrated in any more detail). The link 500 likewise has a central section 506, in which it has a relatively thin wall thickness, and respective end sections 507 with relatively thick wall thickness, wherein the wall thickness in the end sections 507 corresponds to the original wall thickness of the blank to be processed. Transition sections 508 are implemented in each case between the end sections 507 and the central section 506.

Figure 17B:
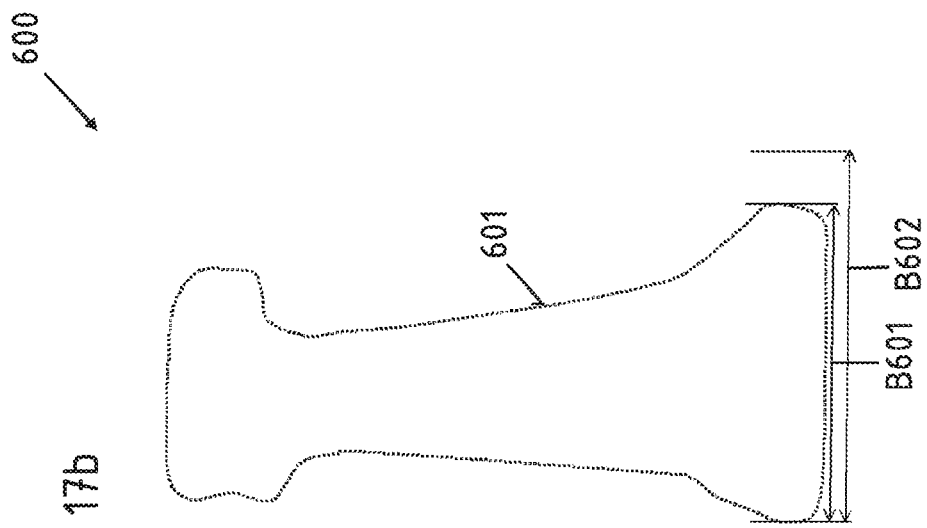
FIGS. 17a and 17b show a B pillar produced by means of the method according to the inventions; and, FIGS. 18a and 18b show a longitudinal member produced by means of the method according to the invention.
Figure 17A:
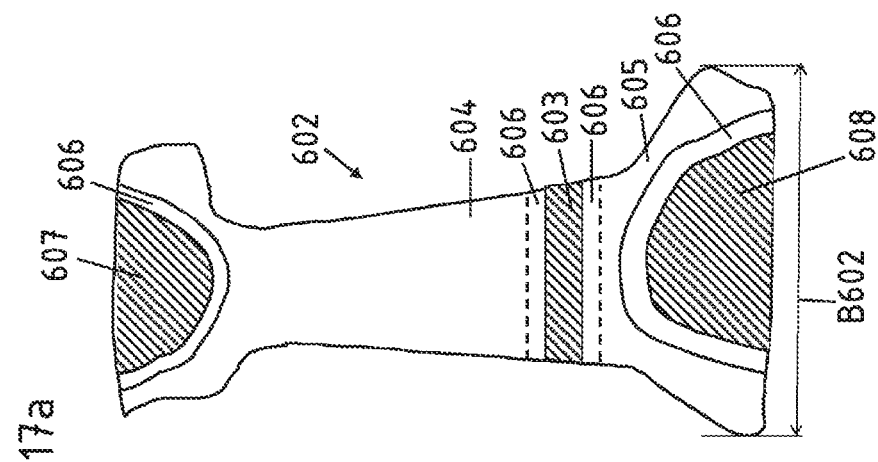

FIGS. 17a and 17b show a production method for a motor vehicle B pillar 600. The outer contour 601 is illustrated in FIG. 17b. Said outer contour has a width B601 which is smaller than the width B602 of a blank 602, which is illustrated in FIG. 17a and which is optimized with regard to loading and cutting waste, for the production of the B pillar. The blank 602 is consequently wider than the starting blank. In a deformation section 603, the B pillar, like the blank 602 also, has a reduced wall thickness in relation to an upper length section and a lower length section 604, 605. In between, in the blank 602 and the B pillar 600 itself, there are implemented transition sections 606 in which the wall thickness transitions from relatively thick wall thickness to reduced wall thickness. Furthermore, in the upper region, there is implemented a section 607 for the attachment of a roof beam, and in the lower region, there is implemented a section 608 for the attachment of a sill, said sections in each case in turn being surrounded by a transition section 606. The attachment sections 607 and 608 are preferably, at least over a section of their area, implemented so as to be thinner than the upper and lower sections 604 and 605. It should be noted that the B pillar 600, which with regard to the illustrated sections substantially corresponds to the blank 602, may be a so-called B pillar reinforcement, or else a so-called outer or inner B pillar. The B pillar is thus a shell-like sheet-metal component which is finally formed from the adapted blank 602 by press forming.

Figure 18B:
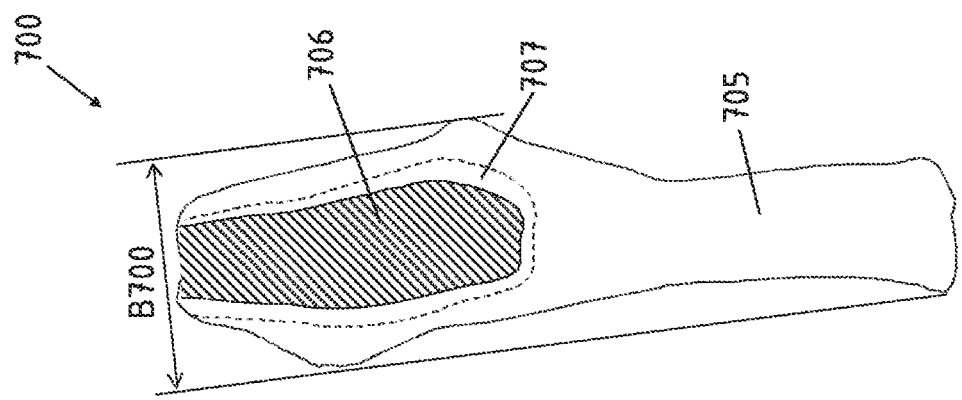
Figure 18A:
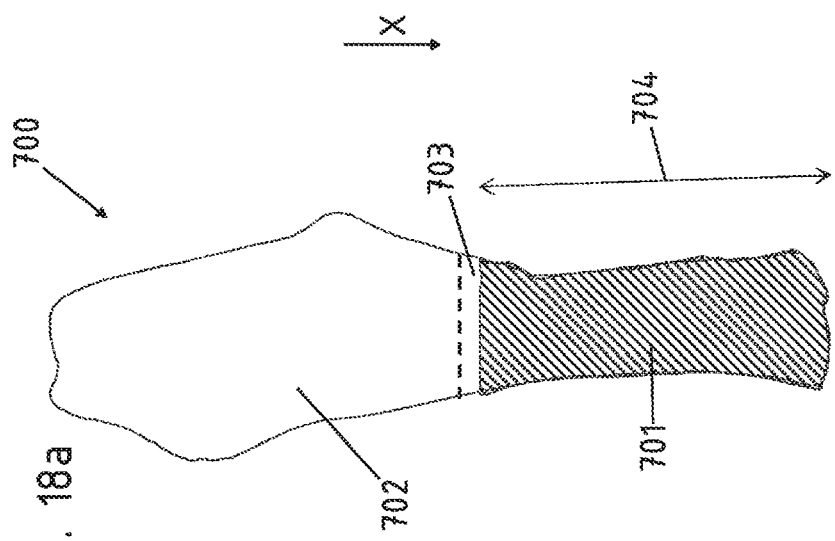

FIGS. 18a and b show in each case a variant for a longitudinal member 700. The latter is in each case implemented so as to be oriented in the motor vehicle X direction. Consequently, the front side of the motor vehicle is at the lower level in the figure. The longitudinal member 700 illustrated in FIG. 18a has a reduced wall thickness in its front section 701 and has a relatively increased wall thickness in its rear section 702. In a transition section 703, the wall thickness transitions from reduced wall thickness to increased wall thickness. The section 701 has thus been lengthened in the longitudinal direction 704. The longitudinal member 700 illustrated in FIG. 18b has a front section 705 with relatively large wall thickness and, in relation thereto, a rear section 706 with a reduced wall thickness. The latter is surrounded by a transition section 707. In the rear region, the wall thickness has been reduced by means of an ironing process. Thus, the width B707 of the longitudinal member increases in said section 706.

The transition sections of the abovementioned exemplary embodiments have a width of between 10 mm and 100 mm, wherein it is preferable for transition sections 707 to be implemented with a width of between 20 mm and 50 mm. The wall thickness of the relatively thin sections is in each case at least 20% smaller than the wall thickness of the relatively thick sections.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A method of producing a sheet-metal formed component having regions with mutually different wall thicknesses, said method comprising:
   providing a sheet-metal material with an initial constant wall thickness;
   preforming the sheet-metal material to obtain a preform by means of a blank holder press, wherein, in an inner region, at least one bulge is generated such that the material is ironed and has a reduced wall thickness;
   flattening and/or spreading out the produced preform;
   separating the sheet-metal material before, during or after the preforming, to obtain a blank;
   trimming and/or introducing holes into the blank; and
   forming the blank to obtain the sheet-metal formed component, wherein the sheet-metal formed component is an axle subframe with regions with mutually different wall thickness, and with screw attachment surfaces, coupling regions and/or bearing receptacles for attachment of links and/or spring struts.

2. The method as claimed in claim 1, wherein the sheet-metal material is a sheet-metal blank or a sheet-metal strip.

3. The method as claimed in claim 1, wherein the at least one bulge comprises
   two bulges which are oriented in opposite directions relative to an original plane of the sheet-metal material, or
   two bulges which are oriented in the same direction relative to an original plane of the sheet-metal material, or
   a undulating shape.

4. The method as claimed in claim 1, wherein the bulge extends over an entire width of the sheet-metal material.

5. The method as claimed in claim 1, further comprising before, during or after the preforming, providing the sheet-metal material with incisions over a part of a width of the sheet-metal material at two opposite margins of the sheet-metal material.

6. The method as claimed in claim 1, wherein the sheet-metal material, as a result of said preforming, has a width which corresponds to an initial width of the sheet-metal material before said preforming.

7. The method as claimed in claim 1, wherein the flattened and/or spread-out blank has a length which is greater than a length of the sheet-metal material in an initial state before said preforming.

8. The method as claimed in claim 1, further comprising austenitizing, hot-forming, and hardening the preformed blank.

9. The method as claimed in claim 1, further comprising austenitizing the sheet-metal material before said preforming the sheet-metal material.

10. The method as claimed in claim 1, wherein
    the blank holder press has at least two blank holders respectively at least at two opposite sides of the inner region, and
    as a result of said preforming, the at least one bulge is generated in the inner region and between the at least two blank holders.

11. The method as claimed in claim 1, wherein the sheet-metal material, as a result of said preforming, has a width which is reduced in relation to an initial width of the sheet-metal material before said preforming.

12. The method as claimed in claim 10, wherein, in said preforming, the sheet-metal material remains flat under the at least two blank holders.

13. The method as claimed in claim 1, wherein said flattening and/or spreading out flattens the at least one bulge.

14. The method as claimed in claim 1, wherein said preforming results in the at least one bulge having the reduced wall thickness with a homogeneous cross-sectional profile.

15. An axle subframe for a motor vehicle, wherein the axle subframe is produced as a sheet-metal formed component in accordance with the method of claim 1,
    wherein said axle subframe is produced as a sheet-metal formed component with regions with mutually different wall thickness,
    wherein the axle subframe has a butterfly shape with
      two end sections, and
      a central section located between said end sections in a longitudinal direction of the axle subframe, and connecting said end sections,
    wherein, in the central section, the axle subframe has a region with reduced wall thickness, which region extends over an entire width of the central section in a transverse direction of the axle subframe and over a part of a length of the central section in the longitudinal direction,
    wherein, in each end section of the two end sections, the axle subframe has a further region with reduced wall thickness, which further region extends over a part of a width of the end section in the transverse direction and over a part of a length of the end section in the longitudinal direction, and
    wherein, on the axle subframe, screw attachment surfaces, coupling regions and/or bearing receptacles are provided for attachment of links and/or spring struts.

16. The axle subframe as claimed in claim 15, wherein the further region with reduced wall thickness in each of the end regions narrows inwardly in the longitudinal direction from a free end of the end region.

17. The axle subframe as claimed in claim 16, wherein the further region with reduced wall thickness in each of the end regions is bordered on both sides in the transverse direction by a region with larger wall thickness.

18. The axle subframe as claimed in claim 17, wherein each of the end sections has a circular recess at a narrowed end of the end section and bordering both the further region with reduced wall thickness and the region with larger wall thickness.

19. The axle subframe as claimed in claim 15, wherein the axle subframe is a shell with an at least partially encircling flange margin.

20. The axle subframe as claimed in claim 19, wherein the axle subframe has a two-shell configuration, wherein the two shells have a hollow profile in cross section which is closed at least in sections.

21. A method of producing a sheet-metal formed component having regions with mutually different wall thicknesses, said method comprising:
    providing a sheet-metal material with a constant wall thickness;
    preforming the sheet-metal material to obtain a preform by means of a press tool, wherein, in said preforming, in an inner region, at least one bulge is generated, and
      a marginal bulge is generated at each of outer regions which delimit the inner region, an amplitude of the marginal bulge is greater than an amplitude of the bulge in the inner region;

flattening and/or spreading out the produced preform;

separating the sheet-metal material before, during or after the preforming, to obtain a blank;

trimming and/or introducing holes into the blank; and forming the blank to obtain the sheet-metal formed component, wherein the sheet-metal formed component is an axle subframe with regions with mutually different wall thickness, and with screw attachment surfaces, coupling regions and/or bearing receptacles for attachment of links and/or spring struts.

22. A method of producing a sheet-metal formed component having regions with mutually different wall thicknesses, said method comprising:

providing a sheet-metal material with a constant wall thickness, preforming the sheet-metal material to obtain a preform by means of a press tool, wherein, in said preforming, in an inner region, at least one bulge is generated in the sheet-metal material, and at two opposite sides of the inner region, during closure of the press tool, two barrier edge bends are respectively generated in the sheet-metal material and effect a slowed follow-on flow of the material outside the barrier edge bends into the inner region between the barrier edge bends, and forming the at least one bulge in the inner region between the barrier edge bends, such that, during the closure of the press tool, the sheet-metal material is ironed in the inner region at the at least one bulge, flattening and/or spreading out the produced preform, separating the sheet-metal material before, during or after the preforming, to obtain a blank, trimming and/or introducing holes into the blank, and forming the blank to obtain the sheet-metal formed component, wherein the sheet-metal formed component is an axle subframe with regions with mutually different wall thickness, and with screw attachment surfaces, coupling regions and/or bearing receptacles for attachment of links and/or spring struts.

\* \* \* \* \*